(12) United States Patent
Whitehill

(10) Patent No.: US 6,531,062 B1
(45) Date of Patent: Mar. 11, 2003

(54) WASTEWATER TREATMENT SYSTEM FOR SMALL FLOW APPLICATIONS

(76) Inventor: Thomas J. Whitehill, 763 Conowingo Rd., Quarryville, PA (US) 17566

( * ) Notice: Subject to any disclaimer, the term of this patent is extended or adjusted under 35 U.S.C. 154(b) by 10 days.

(21) Appl. No.: 09/949,429

(22) Filed: Sep. 10, 2001

(51) Int. Cl.⁷ .................................................. C02F 3/04
(52) U.S. Cl. ........................ 210/602; 210/605; 210/607; 210/617; 210/150; 210/170; 210/196; 210/254; 210/532.2; 210/903
(58) Field of Search ................................ 210/602, 605, 210/607, 617, 621, 622, 625, 747, 150, 151, 170, 195.1, 196, 254, 532.2, 903

(56) References Cited

U.S. PATENT DOCUMENTS

| | | | | |
|---|---|---|---|---|
| 3,770,623 A | * | 11/1973 | Seidel | 210/602 |
| 4,818,384 A | | 4/1989 | Mayer | 210/86 |
| 5,288,407 A | | 2/1994 | Bodwell et al. | 210/617 |
| 5,437,786 A | * | 8/1995 | Morsley et al. | 210/602 |
| 5,480,561 A | | 1/1996 | Ball et al. | 219/744 |
| 5,531,894 A | * | 7/1996 | Ball et al. | 210/617 |
| 5,609,754 A | * | 3/1997 | Stuth | 210/151 |
| 5,637,228 A | * | 6/1997 | Kickuth | 210/602 |
| 5,676,828 A | | 10/1997 | Kallenbach et al. | 210/117 |
| 5,690,827 A | * | 11/1997 | Simmering et al. | 210/747 |
| 5,863,433 A | | 1/1999 | Behrends | 210/602 |
| 5,893,975 A | * | 4/1999 | Eifert | 210/254 |
| 5,897,777 A | * | 4/1999 | Zoeller et al. | 210/170 |
| 5,997,735 A | * | 12/1999 | Gorton | 210/196 |
| 6,159,371 A | | 12/2000 | Dufay | 210/602 |
| 6,238,563 B1 | * | 5/2001 | Carroll, II et al. | 210/151 |
| 6,264,838 B1 | * | 7/2001 | Nivens, Jr. | 210/602 |
| 6,372,137 B1 | * | 4/2002 | Bounds | 210/617 |
| 6,428,691 B1 | * | 8/2002 | Wofford | 210/170 |

* cited by examiner

Primary Examiner—Christopher Upton
(74) Attorney, Agent, or Firm—Martin Fruitman

(57) ABSTRACT

The apparatus is a small flow wastewater treatment system. The system uses a recirculating packed media filter for the initial treatment of effluent from a device such as a septic tank. The incoming wastewater is furnished to the recirculating packed media filter intermittently to permit air into the filter for maintaining high levels of oxygen for bacteria action. The recirculating packed media filter is followed by a subsurface flow constructed wetland. The wastewater entering the apparatus of the invention is divided into two parts so that 5 to 25 percent of the incoming flow bypasses the recirculating packed media filter and goes directly into the subsurface flow constructed wetland to encourage bacteria action that converts nitrates into gaseous nitrogen.

8 Claims, 1 Drawing Sheet

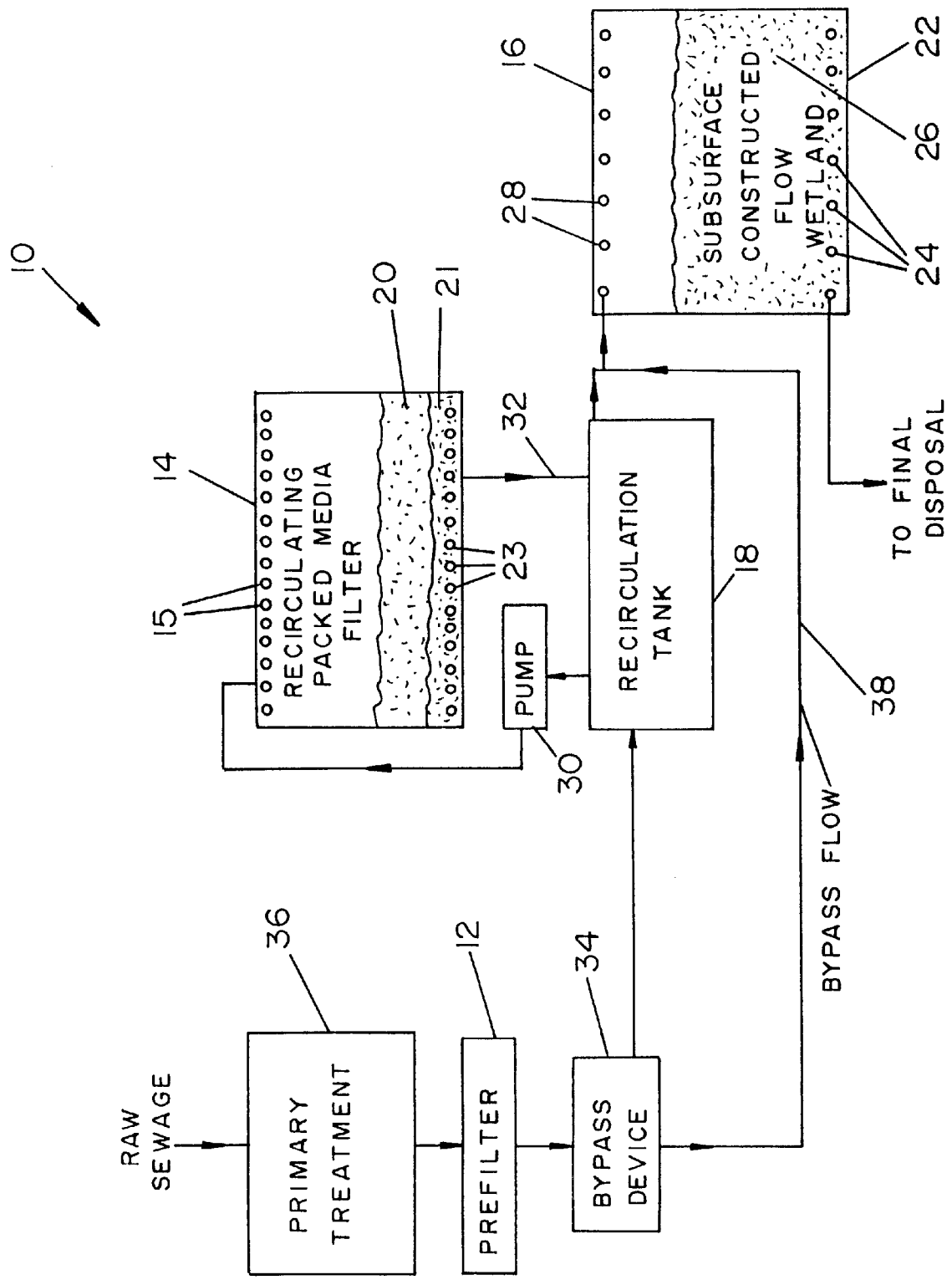

WASTEWATER TREATMENT SYSTEM FOR SMALL FLOW APPLICATIONS

BACKGROUND OF THE INVENTION

This invention deals generally with wastewater treatment and more specifically with a wastewater purification system for small flow applications.

As environmental standards and regulations become more stringent, it is less likely that any wastewater treatment system dependent on only a septic tank, other than those serving only a single residence, can meet the required standards. In fact, even a septic tank for a single residence may not meet the regulations if the soil conditions or background nitrate-nitrogen levels are not suitable for the most common wastewater "treatment" system, a drain field which simply spreads the wastewater over a large area below ground surface.

The processes generally used to treat the wastewater from septic tanks and other small flow systems requiring treatment beyond reduction in organic strength are generally referred to as "tertiary" treatment systems, and their goal is to reduce the biological nutrient content in the wastewater. One of the most significant biological nutrients is nitrogen, and nitrogen is a particular problem in agricultural areas, which are also the most likely regions to lack the population density to warrant the construction of full capability municipal sewage disposal facilities.

However, without proper treatment, nitrogen contamination of groundwater that supplies wells may result in nitrate levels exceeding the drinking water standard for nitrogen, which is 10 milligrams per liter. Since the contaminated groundwater also ultimately flows into groundwater fed streams, the elevated nitrogen levels can also result in steam eutrophication and a general degradation in water quality.

The removal of nitrogen from wastewater is actually a two step process. The first step, called nitrification, requires conversion of the nitrogen in ammonia to nitrogen in nitrates. This is accomplished by the use of aerobic bacteria; nitrosomonas and nitrobacter, that are already present in domestic wastewater. These bacteria grow and multiply in the presence of dissolved oxygen when the oxygen has a concentration of greater than 1 milligram per liter, and the bacteria use the nutrients present in the wastewater as their food source. The natural action of the bacteria converts ammonia nitrogen into nitrate nitrogen.

The second stage of the nitrogen removal process involves the conversion of the nitrate nitrogen into gaseous nitrogen and is called denitrification. This is accomplished by other bacteria, many varieties of which also naturally exist in the wastewater. These bacteria perform the conversion of nitrates to gaseous nitrogen, but only under the condition that the dissolved oxygen in the wastewater is below 1 milligram per liter. When this condition is met, the bacteria generate gaseous nitrogen from the nitrates, and the nitrogen is released harmlessly into the atmosphere. The reduction of dissolved oxygen in the wastewater is a result of the bacteria respiration, so essentially the denitrification process can be automatically triggered by the previous process of nitrification.

The most common systems presently used to treat wastewater are modified suspended growth processes such as the activated sludge process, which can operate conventionally or with a sequential batch reactor. For the nitrification step, these systems add air into the wastewater, either before or after the solids are settled out, to dissolve air into the liquid. This adds oxygen to the wastewater and simultaneously reduces the organic strength of the waste. The aeration is then stopped, and the natural respiration action of the bacteria present in the wastewater causes the dissolved oxygen level in the wastewater to drop. When the dissolved oxygen level falls below 1 milligram per liter, the denitrification step begins.

The success of this technique in suspended growth reactors requires very close control of the dissolved oxygen levels during each phase of the treatment. In larger facilities where trained full-time operators and automated process sensors, particularly oxygen sensors, are used to control the operating parameters, and the waste flow and strength are relatively stable, the process works reasonably well. However, small community, commercial, and on site systems attempting to achieve removal of nitrogen face a more difficult task. Wastewater composition and quantity are highly variable, and full-time certified operators familiar with the process and the sophisticated process control equipment are rarely employed.

For installations dealing with relatively small quantities of waste, it would be very beneficial to have a simple wastewater treatment system which operates without highly trained personnel and without sophisticated and expensive equipment.

SUMMARY OF THE INVENTION

The present invention is an apparatus which uses and encourages the natural bacteriological processes so that the entire process of removal of nitrogen from wastewater needs only minimal control.

For purposes of the description of the invention, and because it is the most common situation in which the invention is used, it is assumed that the primary treatment of the waste is by a septic tank. The septic tank, or other equivalent primary treatment, functions to remove the solid waste, typically by settling the solid waste to the bottom of a tank. Such a primary treatment device should, of course, provide reliable and efficient removal of solid waste, but a second apparatus for further solid removal is also desirable.

Typically, this secondary treatment is a prefilter device, many of which are already conventionally used for wastewater treatment. The function of such a prefilter device is to further reduce the solids in the wastewater to prevent clogging of the subsequent treatment apparatus and bypass device. This device may be a flow diversion valve or simply a smaller diameter pipe than the primary pipe which delivers septic tank effluent to the recirculation tank.

After the solid material is satisfactorily removed, the remaining wastewater, the effluent, is put through a recirculating packed media filter which includes a recirculating tank. The recirculating packed media filter has a fine gravel media or coarse sand which supports a bacterial "fixed film". The fixed film consists of a variety of bacteria which are already present in the wastewater being treated and form a layer or film of bacteria cells which is attached to the sand or gravel in the recirculating packed media filter.

The wastewater is treated as it flows over the fixed film, and the bacteria extract nutrients necessary for their respiration and growth from the wastewater, thus purifying the wastewater stream. In order to maintain aerobic conditions in the recirculating packed media filter the wastewater is fed into the recirculating packed media filter by pulse dosing, intermittently feeding, the wastewater from a recirculating tank back into the recirculating packed media filter. Between the dosings of wastewater, the wastewater drains from the recirculating packed media filter permitting air to enter into the spaces within the media and provide oxygen to maintain aerobic conditions.

The recirculating packed media filter is followed by a subsurface flow constructed wetland into which the initially treated wastewater flows for denitrification. The subsurface flow constructed wetland provides the anoxic environment, with less than 1 milligram per liter of oxygen, necessary to convert the nitrate based nitrogen in the effluent flowing from the recirculating packed media filter into nitrogen gas.

To aid in the denitrification process some wastewater entering the nitrogen removal system of the invention is diverted around the recirculating packed media filter and flows directly into the subsurface flow constructed wetland. This bypass flow is in the range of 5 to 25% of the entire wastewater flow, and the ratio is dependent upon the input wastewater strength and the limit for nitrogen concentration in the system's output. The bypass flow into the subsurface flow constructed wetland serves the dual purposes of providing a carbon source for the denitrification process and accelerating the transition from aerobic conditions, with oxygen levels above 1 milligram per liter, to the anoxic conditions required for the denitrification.

The invention thereby accomplishes its purpose of nitrogen removal with only two major components, a recirculating packed media filter and a subsurface flow constructed wetland. This simple and relatively passive apparatus requires significantly less operator attention, and yields energy savings of at least 50% compared to conventional suspended growth systems.

BRIEF DESCRIPTION OF THE DRAWING

The FIGURE is a schematic block diagram of the operating apparatus of the invention.

DETAILED DESCRIPTION OF THE INVENTION

The FIGURE is a block diagram of the preferred embodiment of wastewater treatment system 10 of the invention in which prefilter 12, recirculating packed media filter 14, and subsurface flow constructed wetland 16 are the significant components. Recirculation tank 18 is an integral part of recirculating packed media filter 14.

Prefilter 12 can be a simple conventional screen apparatus which functions to separate out the solid particles from the wastewater entering the treatment system 10. The removal of the solids is necessary to prevent clogging the filter media within recirculating packed media filter 14, the bypass device, and the various pipes and dosing orifices in the treatment system. The solids should be screened to less than ⅛ inch diameter, and a continuous flow vortex system is another means for accomplishing such prefiltering.

Recirculating packed media filter 14 contains an impervious liner to prevent ground water contamination and a fine gravel or coarse sand filter media with an effective size of 1.5 to 3.0 mm. Effective size is defined as the diameter of a particle which has a weight greater than only 10 percent of the particles within the media, and is typically determined by a sieve analysis. The particles within recirculating packed media filter 14 are distributed in a top layer 20 to a depth of 24 to 30 inches supported by lower layer 21 of 9 to 12 inches of graded coarse gravel Drain pipes 23 are located within lower layer 21 to feed return pipe 32. Top layer 20 includes a "fixed film" of bacteria attached to the particles. The fixed film is a variety of bacteria that are already present in the wastewater being treated and which attach themselves to the surfaces of the media particles forming layer 20.

Subsurface flow constructed wetland 16 is constructed with an impervious liner 22 which covers the bottom and extends up the sides to prevent groundwater contamination. A network of outlet pipes 24 is located just above the bottom liner and a 30 to 60 inch layer 26 of medium gravel, with an effective size of 3 to 8 mm, covers outlet pipes 24 and bottom liner 22. Inlet distribution piping 28 is located above gravel layer 26 to distribute the incoming wastewater over the top of entire gravel layer 26. Subsurface flow constructed wetland 16 can also include vegetation, but when it does not, it is sometimes referred to as a rock filter Dosing pump 30 interconnects recirculation tank 18 to recirculating packed media filter 14, and actually is the only source to supply wastewater to recirculating packed media filter 14 for treatment. Wastewater enters recirculating packed media filter 14 through a network of dosing pipes 15 so that the wastewater is distributed over all of filter media layer 20. Return pipe 32 also interconnects recirculating packed media filter 14 to recirculation tank 18 and is used to return wastewater which drains from the media to the tank.

Bypass device 34 receives the wastewater from screened primary treatment apparatus 36, typically a septic tank, through prefilter 12, and directs most of it into recirculation tank 18 while a portion of the wastewater is permitted to flow directly to subsurface flow constructed wetland 16. The purpose of this bypass flow and the function of dosing pump 30 are explained in the following description of the operation of the invention.

Primary treatment 36, which in the preferred embodiment is a septic tank, functions to remove the solid waste, typically by settling the solid waste to the bottom of a tank. However, it is desirable to use a second apparatus for further solid removal.

This secondary treatment is prefilter 12. Many such devices are conventionally used for wastewater treatment. Prefilter 12 removes the remaining solids in the wastewater to prevent clogging of the subsequent treatment apparatus, particularly the spaces within the filter material in recirculating packed media filter 14 and the recirculating media dosing laterals.

Recirculating packed media filter 14 and recirculation tank 18 operate together to perform the nitrification step, particularly to add oxygen to the effluent coming from prefilter 12. This effluent actually enters recirculating packed media filter 14 through recirculation tank 18.

To maintain the required aerobic conditions in recirculating packed media filter 14, the effluent is fed into recirculating packed media filter 14 by pulse dosing through pump 30. This involves intermittently feeding the effluent from recirculating tank 18 into recirculating packed media filter 14. Between the dosings of wastewater, the effluent drains from recirculating packed media filter 14 back into recirculation tank 18, thus allowing air to enter into the spaces within the filter media of layer 20. This furnishes sufficient oxygen to maintain aerobic conditions within layer 20. Pump 30 typically operates to furnish effluent to recirculating packed media filter 14 for 2 to 5 minutes with 15–30 minutes between dosings. The duration and frequency of dosing is dependent on the strength and temperature of the wastewater entering recirculating packed media filter 14 and upon the limits for total nitrogen content in the liquid leaving wastewater treatment system 10.

A fixed film becomes attached to the media of recirculating packed media filter 14, and is actually a variety of bacteria which are already present in the wastewater being treated. As the wastewater flows over the fixed film, the bacteria extract nutrients necessary for their respiration and growth from the wastewater, thus purifying the wastewater stream. Aerobic conditions are maintained in recirculating packed media filter 14 because the wastewater is fed into recirculating packed media filter 14 by the pulse dosing.

Recirculating packed media filter 14 is followed by subsurface flow constructed wetland 16 into which the wastewater from recirculating packed media filter 14 flows for denitrification. The flow of wastewater from recirculating packed media filter 14 into subsurface flow constructed wetland 16 is controlled by a conventional float valve which diverts all or a fixed portion of the wastewater into subsurface flow constructed wetland 16 when the liquid level in recirculating tank 18 reaches a prescribed level.

Subsurface flow constructed wetland 16 provides the anoxic environment, with less than 1 milligram per liter of oxygen, necessary to convert the nitrate based nitrogen in the effluent flowing from recirculating packed media filter 14 into nitrogen gas. This process is accomplished by the natural respiration action of the bacteria within the wastewater when they are exposed to the anoxic environment within subsurface flow constructed wetland 16.

The bypass flow in bypass pipe 38 coming from bypass device 34 functions to aid in the denitrification process. Bypass device 34 diverts some untreated wastewater from primary treatment unit 36 around recirculating packed media filter 14, and the untreated wastewater flows directly into subsurface flow constructed wetland 16. This bypass flow is in the range of 5 to 25% of the entire wastewater flow, and the ratio is dependent upon the input wastewater strength and the limit for nitrogen concentration in the system's output. The raw wastewater flowing into subsurface flow constructed wetland 16 serves the dual purposes of providing a carbon source for the denitrification process and speeding up the change from aerobic conditions in recirculating packed media filter 14, with oxygen levels above 1 milligram per liter, to the anoxic conditions required in subsurface flow constructed wetland 16 for denitrification.

The present invention provides the benefit of separate and independent systems for the two required processes of wastewater purification. Recirculating packed media filter 14 and subsurface flow constructed wetland 16 can be independently designed and optimized for their respective treatment steps by adjusting the dosing frequency and duration of recirculating packed media filter 14 land the bypass ratio of subsurface flow constructed wetland 16 in response to incoming effluent characteristics. Once the optimization is accomplished, the wastewater treatment system of the invention is more stable in response to flow variations than is the prior art.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters Patent of the United States are desired to be secured is:

1. A wastewater treatment apparatus for removing nitrogen from wastewater flowing from a primary sewage treatment system comprising
    a bypass device which separates wastewater entering the apparatus into a first flow path and a second flow path;
    a recirculating media filter holding a filter media with the recirculating media filter including an input connection located above the filter media, a return pipe located below the filter media;
    a recirculation tank with an output, a first input connected to the return pipe of the recirculating media filter, and a second input connected to the first flow path of the bypass device and receiving wastewater from the return pipe and from the first flow path;
    a pump interconnected to the input connection of the recirculating media filter and to the recirculation tank and intermittently delivering wastewater from the recirculation tank to the input connection of the recirculating media filter; and
    a subsurface flow constructed wetland including a filter media and with an input interconnected with the output connection of the recirculation tank and with an input interconnected with the second flow path of the bypass device and also having an output for discharging wastewater from the wastewater treatment apparatus.

2. The apparatus of claim 1 wherein the filter media in the recirculating media filter has two layers, a lower layer of coarse gravel and an upper layer of fine gravel.

3. The apparatus of claim 1 wherein the filter media in the subsurface flow constructed wetland is a layer of medium gravel.

4. The apparatus of claim 1 wherein the bypass device diverts a flow into the second flow path which is in the range of between 5 and 25 percent of the flow entering the bypass device.

5. The apparatus of claim 1 further including a prefilter which separates out solid material from the wastewater entering the apparatus before the wastewater flows into the bypass device.

6. The apparatus of claim 1 wherein the recirculating media filter is a recirculating packed media filter.

7. A method of removing nitrogen from wastewater leaving a primary treatment device comprising:
    dividing the wastewater leaving the primary treatment device into a first flow and a second flow, with the second flow containing a portion of the total flow in the range of between 5 and 25 percent;
    moving the first flow into a recirculation tank;
    intermittently moving the wastewater from the recirculation tank into a recirculating media filter;
    moving the wastewater within the recirculating media filter through a filter media and then back into the recirculation tank in a manner which permits the recirculating media filter to be exposed to air;
    moving the wastewater containing nitrates from the recirculating tank and into a subsurface flow constructed wetland;
    also moving the second flow into the subsurface flow constructed wetland; and
    discharging effluent from the subsurface flow constructed wetland that has a nitrogen content lower than the initial wastewater.

8. The method of claim 7 further including prefiltering the wastewater to remove solids from the wastewater before dividing the wastewater into a first flow and a second flow.

* * * * *